United States Patent
De Donno et al.

(10) Patent No.: US 7,145,716 B2
(45) Date of Patent: Dec. 5, 2006

(54) MULTIPLE STAGE RAMAN OPTICAL AMPLIFIER

(75) Inventors: Marco De Donno, Milan (IT); Alain Repingon, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/538,846

(22) PCT Filed: Dec. 19, 2002

(86) PCT No.: PCT/EP02/14532

§ 371 (c)(1),
(2), (4) Date: Feb. 14, 2006

(87) PCT Pub. No.: WO2004/057712

PCT Pub. Date: Jul. 8, 2004

(65) Prior Publication Data

US 2006/0158717 A1    Jul. 20, 2006

(51) Int. Cl.
*H01S 3/00* (2006.01)
(52) U.S. Cl. ............... 359/341.32; 359/334; 359/337.4
(58) Field of Classification Search ................. 359/334, 359/341.32, 337.4
See application file for complete search history.

(56) References Cited

U.S. PATENT DOCUMENTS

| | | | |
|---|---|---|---|
| 5,253,104 A | 10/1993 | Delavaux | |
| 5,623,362 A | 4/1997 | Mitsuda et al. | |
| 5,673,280 A | 9/1997 | Grubb et al. | |
| 6,359,725 B1 | 3/2002 | Islam | |
| 6,487,006 B1* | 11/2002 | Chen | 359/341.32 |
| 6,606,337 B1* | 8/2003 | King | 372/70 |
| 6,618,191 B1* | 9/2003 | Grochocinski et al. | 359/334 |
| 6,631,025 B1* | 10/2003 | Islam et al. | 359/334 |
| 6,643,058 B1* | 11/2003 | Pianciola et al. | 359/341.3 |
| 6,771,413 B1* | 8/2004 | Cornwell et al. | 359/337.1 |
| 6,798,945 B1* | 9/2004 | Pasquale et al. | 385/24 |
| 6,900,933 B1* | 5/2005 | Li et al. | 359/341.32 |
| 6,903,863 B1* | 6/2005 | Carniel et al. | 359/334 |
| 6,915,037 B1* | 7/2005 | Bellemare et al. | 385/24 |
| 7,079,313 B1* | 7/2006 | Ogiwara et al. | 359/341.32 |
| 2002/0105715 A1 | 8/2002 | Naito et al. | |
| 2002/0122242 A1* | 9/2002 | Shimojoh | 359/334 |
| 2002/0159138 A1* | 10/2002 | Zou | 359/341.32 |

(Continued)

FOREIGN PATENT DOCUMENTS

EP    0 588 557 A1    3/1994

(Continued)

*Primary Examiner*—Deandra M. Hughes
(74) *Attorney, Agent, or Firm*—Finnegan, Henderson, Farabow, Garrett & Dunner, L.L.P.

(57) ABSTRACT

A multiple stage Raman amplifier includes an interstage wavelength-selective pump combiner. Wavelength-selection characteristics are such that the pump combiner substantially blocks the passage of the pump signal of the first stage to the second stage and/or vice versa while allowing the passage of the transmission signal from the first stage to the second stage. The pump combiner substantially blocks different portions of the wavelength spectrum of the pump radiation which is fed into the pump combiner from different ports. The pump combiner preferably includes thin-film filters. The pump combiner has the multiple function of coupling the pump signal of the first (or second) pump source and of isolating from one another the pump signals of the two amplification stages. This allows the reduction of the number of passive components present in a multistage optical amplifier, which in turn leads to a decrease of the overall insertion loss in the amplifier and to shorter assembly processing.

9 Claims, 5 Drawing Sheets

U.S. PATENT DOCUMENTS

2002/0163714 A1* 11/2002 Pianciola et al. ........ 359/341.3

FOREIGN PATENT DOCUMENTS

| EP | 1 168 686 | A1 | 1/2002 |
| EP | 1 220 383 | A1 | 7/2002 |
| WO | WO 02/075996 | A1 | 9/2002 |

* cited by examiner

MULTIPLE STAGE RAMAN OPTICAL AMPLIFIER

CROSS REFERENCE TO RELATED APPLICATION

This application is a national phase application based on PCT/EP2002/014532, filed Dec. 19, 2002, the content of which is incorporated herein by reference.

BACKGROUND OF THE INVENTION

1. Field of the Invention

The invention relates to a Raman multiple-stage optical amplifier for fibre optic communication systems.

2. Description of the Related Art

Raman amplification is becoming increasingly important in optical communication systems, in particular in high-bit rate wavelength division multiplexing systems and dense wavelength division multiplexing (DWDM) systems. An important advantage of Raman amplification is that the effective optical signal-to-noise ratio is significantly lower than that of an erbium-doped fibre amplifier (EDFA) having the same gain.

Another advantage of using Raman amplifiers over the more conventional EDFAs is the possibility of expanding the amplification of optical signals over the entire transmission band, from 1300 nm to 1700 nm. Through a careful selection of pump wavelengths, a Raman amplifier can operate on a wide number of wavelengths, spanning the S (short-wavelength band, approximately 1440 to 1520 nm), C-band (about 1520–1570 nm) and L band (about 1570–1630 nm).

Raman amplifiers take advantage of stimulated Raman scattering (SRS), a non linear effect that can cause broadband optical gain in optical fibres. SRS can be used to amplify an optical signal at a certain wavelength by the use of a strong radiation at a lower wavelength, called the pump radiation. Raman gain results from the interaction of intense light with optical phonons of the glass constituting an optical fibre. The transmission fibre itself can be used as an amplifying medium for signals as they travel towards a repeater or a receiving terminal and the resulting gain is distributed over a length (typically up to tens of kilometres) of the fibre. Raman gain can be generated virtually in all types of fibres. Standard single-mode fibres, dispersion-shifted fibres or non-zero dispersion fibres can all act as the gain medium, although with different pump efficiencies. In this context, an optical fibre used as Raman amplifying medium for signals will be referred to as a Raman-active optical fibre.

It is possible to use Raman amplification where the signal and the pump are propagating in the same direction, but one can also propagate the pump in the counter-propagating direction, i.e., towards the signal transmitter. The two pumping schemes are denoted by forward (or co-propagating) and backward (or counter-propagating) pumping, respectively.

An important issue in the design of optical amplifiers is the gain flatness over the bandwidth of amplification. The wavelength and bandwidth of a Raman amplifier may be determined by choosing the wavelength of the Raman pump used to produce the gain. Multiple pumps at different wavelengths can be used to widen and flatten the gain curve of Raman amplification. However, it may become difficult to increase the bandwidth of a Raman amplifier using multiple pumps beyond a limited amount Multiple-stage Raman amplifiers have been proposed in order to increase the amplified bandwidth.

U.S. Pat. No. 5,673,280 describes a optical fibre Raman amplifier comprising an upstream and a downstream length of amplified fibre with an interstage optical isolator disposed between the upstream and downstream lengths of amplifier fibre such that the passage of back-scattered signal radiation from the latter to the former is substantially blocked. The interstage isolator is positioned between an upstream and a downstream interstage wavelength division multiplexers (WDMs) connected by a fibre that shunts pump radiation around the isolator.

Applicants have noted that two WDMs are necessary, besides an interstage isolator, to shunt pump radiation and isolate the two amplification stages, thereby increasing the number of passive components present in the two stage amplifier.

U.S. Pat. No. 6,359,725 discloses a multi-stage amplifier including a circulator between the first and the second lengths of the amplifier fibres. The circulator is said to be useful as a means of dumping the remaining pump which can be reused elsewhere for monitoring purposes.

Applicants have observed that, generally, optical circulators are not particularly suitable for high-power pump source outputs, i.e., up to about 1 W, and for broad bandwidth amplification, conditions often needed for Raman amplification in WDM systems.

U.S. Pat. No. 5,253,104 discloses a doped fibre optical amplifier which utilises a single four-port WDM and two separate sections of doped fiber. A pair of pump signals are coupled into two ports of the multiplexer so as to provide co- and counter-propagating pump signals to both sections of doped fibres.

Thin film filters are used in optical components and they exhibit low loss, broad bandwidth and have excellent filter functions. They have been demonstrated for channel spacing as narrow as 100 GHz and more recently 50 GHz. Thin film filters can be integrated with other WDM devices to create hybrid components and modules which have lower loss than modules composed of spliced devices. WO patent application No. 2002/075996 describes a multiplexer and a demultiplexer including a plurality of optical structures, each optical structure being formed by thin film layers. EP application No. 1168686 describes a bidirectional transmission system using dual channel bands. Wide band thin film optical filters combine and separate the signal at each node of the transmission system.

SUMMARY OF THE INVENTION

Pump radiation is optically coupled to the amplifying fibre generally by means of a WDM coupler that combines the signal band to be amplified with the pump radiation and couples the superimposed signal to one end of the amplifying fibre.

Applicants have realised that in a Raman multiple stage optical amplifier it is advantageous to decrease the number of passive components necessary for coupling the pump signals with the transmission signal.

Applicants have further observed that, when the pump signals of the different amplification stages have distinct wavelength bands, it is highly desirable to isolate from one another the pump signals, i.e., to prevent the pump signal of a first (second) amplification stage from passing into a second (first) amplification stage. In particular, the pump power originating from the pump source of an amplification stage, entering one end of the Raman-active optical fibre and arriving at the other end of the fibre, i.e., the residual pump power, should be prevented from being transmitted through the other amplification stage. This is to avoid amplification of the residual pump signal together with the transmission signal and competition between the two different pump signals. Applicants have noted that a poor isolation of the pump signals between the different amplification stages leads to a degradation of the amplifier gain flatness and to an increase of the second order non linear effects.

In a broad aspect the invention relates to a multiple stage Raman amplifier including an interstage wavelength-selective pump combiner. Wavelength-selection characteristics are such that the pump combiner substantially blocks the passage of the pump signal of the first stage to the second stage and/or vice versa while allowing the passage of the transmission signal from the first stage to the second stage. The pump combiner substantially blocks different portions of the wavelength spectrum of the pump radiation which is fed into the pump combiner from different ports.

Thus, the pump combiner has the multiple function of coupling the pump signal of the first (or second) pump source and of isolating from one another the pump signals of the two amplification stages. This allows the reduction of the number of passive components present in a multistage optical amplifier, which in turn leads to a reduction of the number of fibre splices necessary for the connection with the passive component. This implies a decrease of the overall insertion loss in the amplifier and shorter assembly processing. Furthermore, because of the smaller size and simplicity of the multiple stage Raman amplifier according to the invention, the overall packaging can be made smaller, thus easier to integrate.

Preferably, the pump radiation of the pump sources propagates in a backward direction to the transmission signal radiation.

The pump combiner comprises at least three input/output ports: two ports are coupled to the first and the second Raman-active optical fibres, respectively, whereas the third port is coupled to the pump source of an amplification stage.

Preferably, the wavelength-selective pump combiner is a four-port device, wherein the fourth port is coupled to a photodetector, e.g., a photodiode, for monitoring the residual pump power of an amplification stage. By monitoring the residual pump power it is possible to estimate the power of the input optical signal and its flatness. Monitoring the residual pump radiation is particularly advantageous in case of variations or instability in the characteristics of the input optical signal because it allows adjustments of the gain of the optical amplifier in response to the variations of the input signal. Therefore, in the preferred embodiment, residual pump monitoring and isolation from one another of the pump signals of the different amplification stages is carried our by a single four-port device, thereby further simplifying the structure of the multiple stage Raman amplifier.

Within an amplification stage, more pump wavelengths, e.g., originating from different pump sources, can be used. The difference between adjacent wavelengths should preferably be not less than about 10 nm in order to achieve a relatively large amplifying bandwidth. The distance between the shortest and the longest pump wavelength within an amplification stage should be preferably not more than about 60 nm so as to avoid interference between pump sources.

The pump sources of the two amplification stages provide pump signals at different wavelengths or wavelength bands. The pump wavelength bands of different amplification stages do not overlap. In case of a two-stage Raman amplifier, wavelengths of the first amplifier stage can be selected within the range of about 1415–1465 nm and wavelengths of the second amplifier stage can be selected within the range of about 1465–1520 nm for amplification of the signal in the C- plus L-band. In a preferred embodiment, the difference between the longest pump wavelength of the first amplification stage and the shortest pump wavelength of the second amplification stage is in the range between 30 and 40 nm.

In one aspect, the invention relates to a multiple stage Raman optical amplifier for amplifying an optical transmission signal within a transmission wavelength band comprising a first amplification stage comprising a first length of Raman-active optical fibre and a first pump source for generating a first pump signal within a first pump wavelength band, said first pump signal being coupled to one end of the first length of Raman-active optical fibre;

a second amplification stage comprising a second length of a Raman-active optical fibre and a second pump source for generating a second pump signal within a second pump wavelength band different from the first wavelength band, said second pump signal being coupled to a first end of the second length of Raman-active optical fibre and whereby residual pump signal appears at a second end, opposite to the first end, of said fibre;

a wavelength-selective pump combiner interposed between the first and the second amplification stages adapted for substantially transmitting the optical transmission signal between the first amplification stage and the second amplification stage, the pump combiner including a first port (A) coupled to said one end of the first Raman-active fibre, a second port (B) coupled to the second end of the second Raman-active fibre, a third port (C) coupled to the first pump source, wherein the pump combiner is arranged for substantially passing the first pump signal coupled to the third port to the first port and for substantially blocking the passage of the residual pump signal coupled to the second port into the first amplification stage.

Preferably, the wavelength-selective pump combiner further includes a fourth port (D) and is arranged for substantially passing the residual pump signal of the second pump source to the fourth port.

The multi-stage Raman amplifier further includes a photodetector optically coupled to the fourth port of the pump combiner for monitoring the residual pump signal of the second pump source.

In a preferred embodiment, the pump combiner includes at least a thin film filter adapted to reflect the first and the second wavelength bands of the pump sources.

According to another aspect, the invention relates to a method for pumping a multiple stage Raman optical amplifier including a first Raman amplification stage and a second Raman amplification stage, the first and second stage being coupled to each other by an interstage wavelength-selective pump combiner, the method comprising:

feeding into the first Raman amplification stage a first pump signal with wavelength within a first pump wavelength band;

feeding into the second Raman amplification stage a second pump signal with wavelength within a second wavelength pump band having no overlap with the first pump wavelength band;

reflecting the second pump signal in the pump combiner so as to prevent a residual pump signal from the second Raman amplification stage within the second pump wavelength band from reaching the first Raman amplification stage.

Preferably, feeding of the first pump signal into the first amplification stage is performed by reflecting said first pump signal in the pump combiner.

The foregoing drawings illustrate the preferred embodiments of the invention and, together with the description, serve to explain the principles of the invention. It is to be understood that both the drawings and the description are not restrictive of the invention.

DETAILED DESCRIPTION

Figure 1:
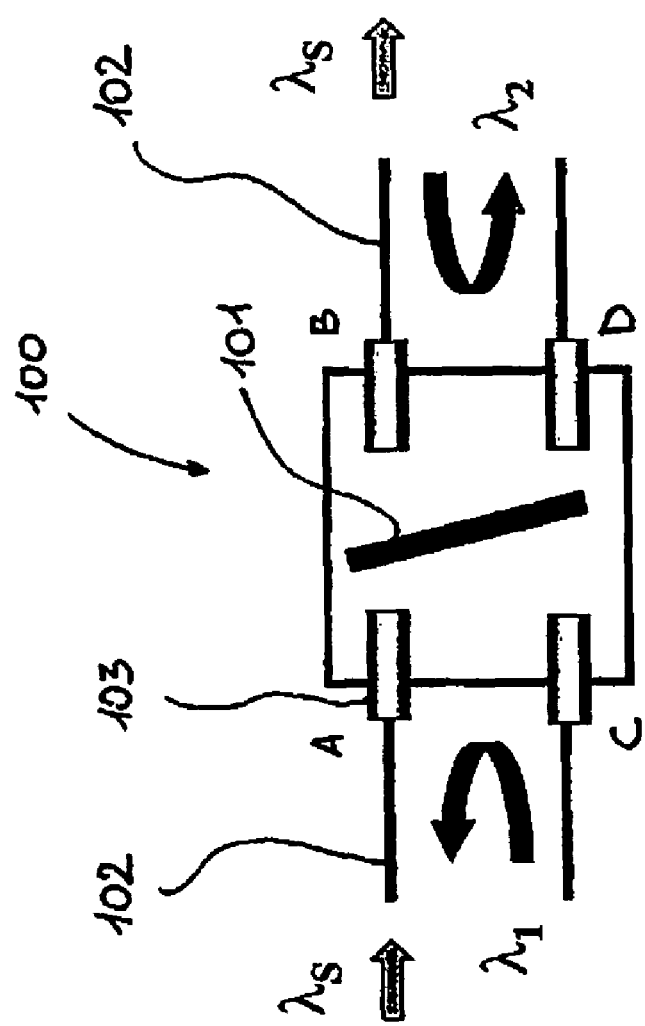
FIG. 1 illustrates a wavelength-selective pump combiner according to the invention.

FIG. 1 illustrates a wavelength-selective wavelength-selective pump combiner 100 for a multi-stage optical amplifier, according to the invention. The pump combiner 100 is a 4-port device having ports A–D, which includes a multi-wavelength selective filter or filters 101 that will be described more in detail below. Each port of the pump combiner can be provided by input/output fibres 102. Radiation entering or leaving the pump combiner through fibres 102 at any of the four ports is focussed by collimators 103. Fibres 102 are for example standard single-mode fibres, such as SMF-28™, produced by Corning. Alternatively, fibres 102 connected to collimators 103 at ports A and B can be fibre sections of the same type of the Raman-active optical fibres to be connected to the pump combiner.

Filter 101 is optically transparent to the signal radiation of wavelength $\lambda_s$, wherein $\lambda_s$ may represent a single wavelength or, such as in the case of WDM transmission, a transmission band, for example comprised between 1520 and 1630 nm, corresponding to about the C- plus L-band. Signal radiation $\lambda_s$ enters the pump combiner at port A and is transmitted by the filter to port B (assuming any internal absorption losses as insignificant). First pump radiation $\lambda_1$ originating from a first pump source is launched to port C of the pump combiner, reflected by filter 101 and then collected by port A. Second pump radiation $\lambda_2$ originating from a second pump source is coupled to port B of the combiner, reflected by the filter and redirected to port D.

Therefore, the pump combiner couples pump radiation $\lambda_1$ and the signal radiation $\lambda_s$ and isolates from one another the pump signals $\lambda_1$ and $\lambda_2$. Preferably, the filter behaves as a reflecting filter for two distinct wavelength bands, i.e., the pump wavelengths, and as a transmission filter for the signal wavelength band. The filter reflects different portions of the wavelength spectrum of the pump radiation that is fed into the pump combiner from different ports.

The filter or filters in the pump combiner are preferably based on thin film filter technology. These films are typically stacks of thin layers of optically transparent dielectric materials having different indices of refraction. The refractive indices of the dielectric materials are sufficiently different to substantially reflect light at the interface of the layers. The reflected light interferes constructively or destructively with the incident light depending on the wavelength of the light. It is well known in the art that thickness of each individual layer can be carefully controlled to obtain the desired reflection band profile. For example, the multi-wavelength selective filter can comprise multilayer reflectors which are deposited on both opposite main surfaces of a quartz substrate. The multilayer reflector on a first main surface of the substrate reflects light in a first wavelength band, whereas the multilayer reflector on the opposite main reflects light in a second wavelength band. Alternatively, the filter can be formed by two filters which are placed in series. One filter transmits light over a selected portion of the optical band, i.e., the signal band, and reflects light that is not within the selected wavelengths, i.e., the wavelengths of the first pump source. The other filter reflects light over a different portion of the spectrum, i.e., the wavelengths of the second pump source, and transmits radiation in the signal band.

Figure 2:
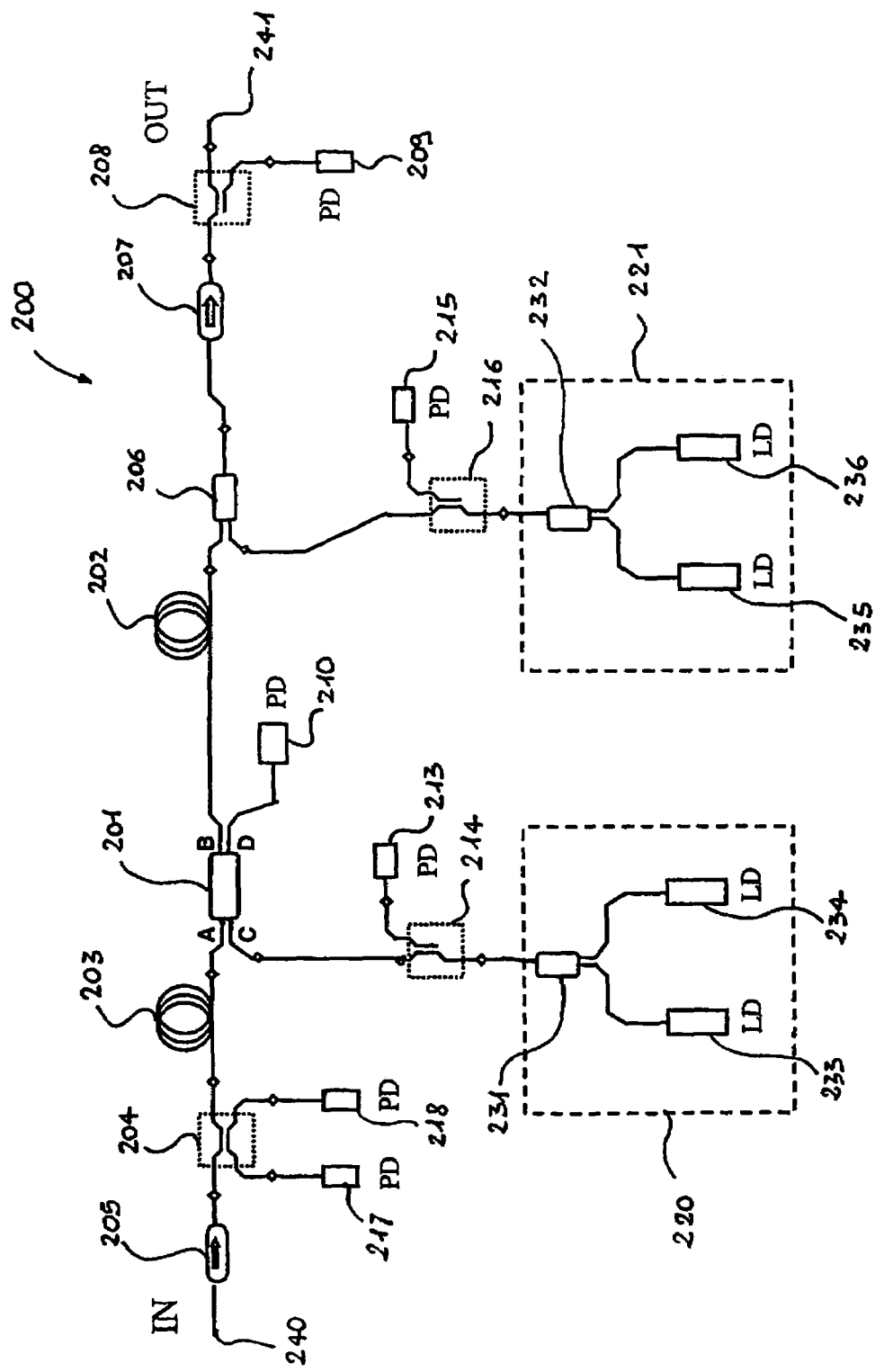
FIG. 2 is a block diagram illustrating a two-stage optical amplifier according to an embodiment of the present invention.

FIG. 2 is a block diagram illustrating a two-stage optical amplifier according to an embodiment of the present invention. A two-stage optical amplifier 200 receives at an input IN an optical signal 240 to be amplified and outputs at an output OUT the amplified output optical signal 241. The input optical signal 240 includes at least a signal wavelength $\lambda_S$. Preferably, the optical signal carries a number of optical channels $\lambda_{S1}, \ldots, \lambda_{Sn}$, comprised between about 1522 nm and 1630 nm. For example, in case of 50 GHz standard ITU-T DWDM channel spacing, the wavelength of the first channel will be 1528.38 nm, while the wavelength of the last channel will be 1622.25 nm, the total number of channels being 228.

The first stage of optical amplifier 200 comprises a first length of Raman active optical fibre 203 and a first pump source 220. The second stage of the Raman amplifier comprises a second length 202 of Raman active optical fibre and a second pump source 221. The first stage of the amplifier is connected to the second stage through a wavelength-selective pump combiner 201. The pump combiner preferably includes multilayer filters (not shown) that transmit certain wavelengths of light and reflects other wavelengths of light. Pump combiner 201 has 4 ports A–D. The optical signal is fed to the pump combiner through port A and leaves the combiner through port B. Pump radiation $\lambda_1$ emitted by first pump source 220 enters the pump combiner 201 at port C. Pump combiner 201 substantially passes pump radiation $\lambda_1$ to port A. For example, $\lambda_1$ is reflected in the pump combiner by one or more thin-film filters before exiting at port A. Therefore, the Raman-active fibre 203 receives counter-propagating pump radiation $\lambda_1$ that amplifies the signal radiation through Raman amplification. In addition, the passage of the pump signal to the second length of Raman fibre is substantially blocked. Optionally, a coupler 214, for example a 99.5% coupler, is placed after pump source 220 in order to monitor the pump output power by means of photodetector 213, e.g., a photodiode. In an exemplary embodiment, pump source 220 comprises two laser modules 233 and 234 having orthogonally polarised laser beams with the same emission wavelength or wavelengths, which are multiplexed by means of a polarisation beam combiner 231.

Pump radiation $\lambda_2$ originating from second pump source 221 is coupled by means of a WDM coupler 206 to the second Raman-active optical fibre 202 in a counter-propagating direction with respect to the signal radiation. WDM coupler 206 combines the optical signal $\lambda_S$ with the pump signal $\lambda_2$ into an output port that is spliced to the Raman-active fibre 202. Residual pump radiation originating from the second pump source and arriving at the other end of the Raman-active fibre 202 enters the pump combiner 201 at port B and is guided, e.g., reflected by one or more multi-layer filters, to port D where it leaves the pump combiner. Thus, the residual pump radiation of the second pump source is substantially prevented from reaching port C, i.e., the input port of the first pump source, as this can cause power and wavelength instability. In addition, the residual pump radiation is prevented from reaching port A, as this could cause a degradation of the amplifier performance. A photodetector 210 is coupled to the port D of the pump combiner to monitor the residual pump power. By monitoring the residual pump power it is possible to estimate the power of the input optical signal, e.g., the signal carried by optical channels $\lambda_{S1}, \ldots, \lambda_{Sn}$, and its flatness. Monitoring the residual pump radiation is particularly advantageous in case of variations or instability in the characteristics of the input optical signal because it allows adjustments of the gain of the optical amplifier in response to the variations of the input signal.

In an exemplary embodiment, the second pump source 221 comprises two laser modules 235 and 236 having orthogonally polarised laser beams with the same emission wavelength or wavelengths, which are multiplexed by means of a polarisation beam combiner 232. Optionally, coupler 216, for example a 99.5% coupler, is placed after pump source 221 for monitoring the pump output power by means of photodiode 215.

For example, the first pump source 220 comprises two laser diodes 233 and 234 which include a fibre Bragg grating in order to lock the emission wavelength at 1430±1 nm and which are pigtailed with a polarisation maintaining fibre, for example the PANDA™ fibre produced by Fujikura. The second pump source 221 comprises two laser diodes 235 and 236 which include a fibre Bragg grating in order to lock the emission wavelength at 1490±1 nm. Preferably, pump power of both pump sources is larger than 350 mW, more preferably of about 500 mW. In general, the optimum value of the pump power will be selected by taking into account the amplifier's gain and the level of back-scattered signal radiation. A careful selection of suitable type and length of Raman-active optical fibres can contribute to the minimisation of back-scattered signal radiation and to the reduction of the overall amplifier noise figure. Preferably, first and second lengths of Raman-active optical fibre comprise 3 km of dispersion-compensating fibre (DCF) having an effective area of about 20 μm², for instance a DCF supplied in the dispersion compensating module N-DCFM-40 produced by Sumitomo. Alternatively, different fibres, i.e., having different optical characteristics, for different amplifier stages may be desirable for optimisation of the overall gain and noise characteristics.

Optical isolator 205 blocks the residual pump radiation from the first pump source from being transmitted to the optical line outside the amplifier (not shown). Optical isolator 207 prevents any feedback of optical signal energy from output port 241 back into the amplifier. Optionally, coupler 204, for instance a 95% coupler, is positioned between isolator 205 and the first length of Raman fibre 203 for monitoring purposes. An output port of coupler 204 is connected to photodiode 217 that monitors the residual pump power from the first amplification stage, while another output port is connected to photodiode 218 that monitors the power of the input optical signal. A very small portion of the amplified output signal light can be branched off after isolator 207 by means of coupler 208, for example a 99% coupler, and is monitored by means of photodiode 209.

Figure 3:
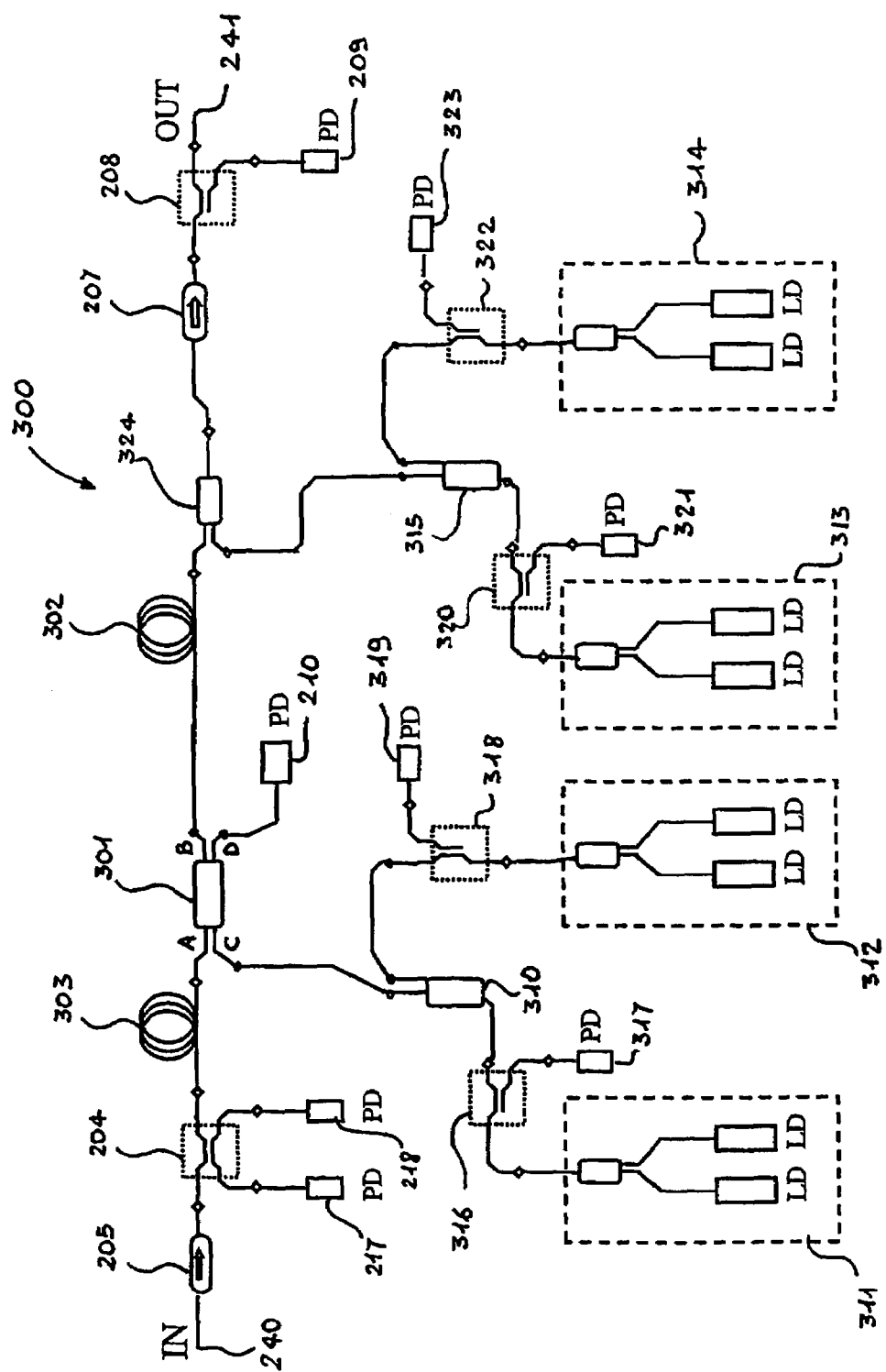
FIG. 3 is a block diagram illustrating a two-stage optical amplifier according to another embodiment of the present invention.

FIG. 3 illustrates a further embodiment of a two-stage Raman amplifier. Elements that correspond to the embodiment of FIG. 2 are given identical numbers. In this embodiment, more than one pump wavelengths are combined together in each amplification stage. The two-stage Raman amplifier 300 comprises a wavelength-selective pump combiner 301. The optical signal is fed to the pump combiner through port A and leaves the pump combiner through port B. The first stage of the Raman amplifier comprises pump source 311 (P1) and pump source 312 (P2), each having a different wavelength, namely $\lambda_{P1}$ and $\lambda_{P2}$, and a first length of Raman-active optical fibre 303. A WDM 310 enables the energy from the two individual sources P1 and P2 to be effectively combined. WDM 310 has preferably a narrow channel spacing with typical passband width not greater than 5 nm. Pump radiation $\lambda_{P1}+\lambda_{P2}$ enters the pump combiner 301 at port C and is guided to port A, e.g., it is reflected in the pump combiner by one or more thin-film filters (not shown) before exiting at port A. Therefore, the Raman-active fibre 303 receives counter-propagating pump radiation that amplifies the signal radiation through Raman amplification.

The second stage of Raman amplifier comprises pump source 313 (P3) and pump source 314 (P4), each having distinct wavelengths $\lambda_{P3}$ and $\lambda_{P4}$, and a second length of Raman-active optical fibre 302. Pump beams from P3 and P4 are combined by means of WDM 315. Pump radiation $\lambda_{P3}+\lambda_{P4}$ is coupled by means of WDM coupler 324 to the second Raman-active optical fibre 302 in a counter-propagating direction with respect to the optical signal. Residual pump radiation $\lambda_{P3}+\lambda_{P4}$ originating from the second pump source and arriving at the other end of the Raman-active fibre 302 enters the pump combiner 301 at port B and is passed to port D, e.g., is reflected by a multilayer filter (not shown) inside the combiner. A photodiode 210 coupled to port D of the pump combiner monitors the residual pump radiation from the second pump source.

Preferably, emission wavelengths of the first pump are comprised between 1415 and 1465 nm and wavelengths of the second pump are comprised in the range 1465–1520 nm. More preferably, the following four pump wavelengths are used: $\lambda_{P1}=1425$ nm, $\lambda_{P12}=1440$ nm, $\lambda_{P3}=1470$ nm, and $\lambda_{P4}=1510$ nm. By choosing these pump wavelengths, the first amplifier stage provides a substantial amplification of a portion of the optical signal having a wavelength comprised in a range between about 1520 nm and 1570 nm (the C band), whereas the second amplifier stage provides a substantial amplification of optical signal having a wavelength comprised in the range between about 1570 and 1620 nm (the L band). The resulting optical gain of the Raman amplifier will be substantially flat, resulting in uniform and efficient amplification over the C- plus L-band. Pump powers of each source is preferably approximately the same and comprised between 350 and 500 mW.

Optionally, a small fraction of the output power of each pump can be branched off by means of a coupler for optical pump monitoring. To this purpose, couplers 316, 318, 320 and 322, which are connected to photodiodes 317, 319, 321, and 323, respectively, can be placed at the exit of each pump.

Figure 4:
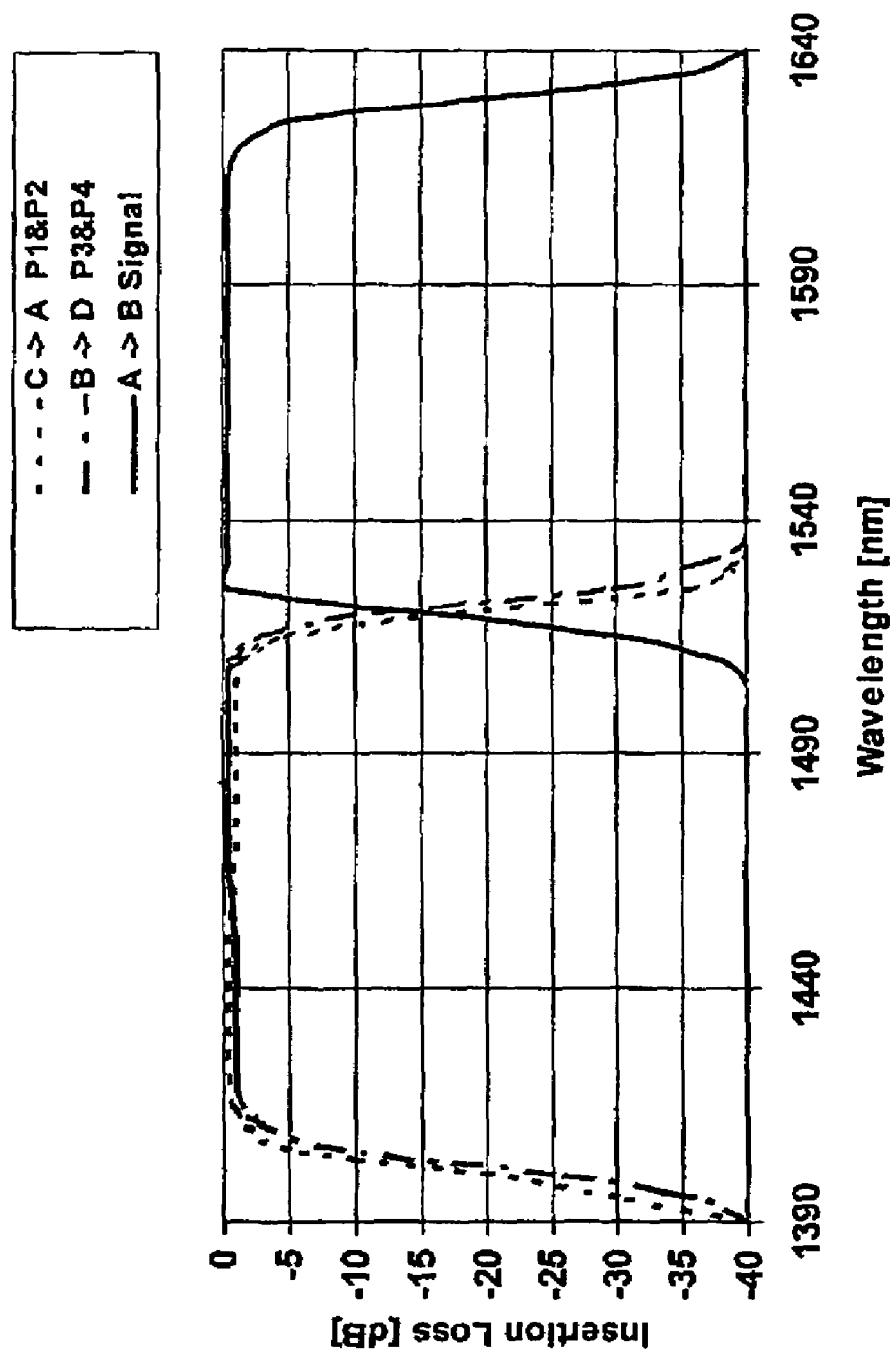
FIG. 4 is a graph illustrating an exemplary transmission/reflection spectrum of the pump combiner according to the invention.

FIG. 4 schematically shows exemplary transmissive/reflective characteristics of a wavelength-selective suitable for the two-stage Raman amplifier shown in FIG. 3. The transmission spectrum is for instance relative to a pump combiner including one or more multilayer reflectors. The port-to-port transmission losses (in dB) are plotted as a function of wavelength λ. Solid line in FIG. 4 represents the transmission loss from port A to port B of the pump combiner. The optical signal having a wavelength in the range of about 1520 to 1630 nm (the transmission band) is transmitted, with virtually zero transmission loss, whereas the optical signal outside the selected band is substantially reflected and thus blocked. Dashed line represents the transmission curve from port C to port A. The combiner shows high transmission C-to-A at least across a wavelength band that ranges from about 1415 nm to about 1455 nm, which approximately corresponds to the pump radiation bands $\lambda_{P1}+\lambda_{P2}$, and a substantial loss over at least the wavelength band between 1520 and 1630 nm (the signal band). Dot-dashed line represents the transmission from port B to port D. The combiner exhibits high transmission B-to-D at least across a wavelength band that ranges from about 1455 nm to about 1410 nm, which approximately corresponds to the pump radiation bands $\lambda_{P3}+\lambda_{P4}$, and a substantial loss over at least the wavelength band between 1520 and 1630 nm (the signal band). The transmissive/reflective characteristics are such that maximum port-to-port isolation, e.g., larger than about −30 dB, is achieved between port C and port B and between port C and port D.

According to an embodiment of the invention, multilayer reflectors which are deposited on both opposite main surfaces of a quartz substrate could be employed in the pump combiner. The multilayer reflector on the first main surface of the quartz reflects the pump wavelengths ranging from about 1415 nm to about 1455 nm, which approximately correspond to $\lambda_{P1}+\lambda_{P2}$. The multilayer reflector on the second opposite surface reflects the pump wavelengths in the band of about 1457–1510 nm, which approximately correspond to $\lambda_{P3}+\lambda_{P4}$. Both reflectors should be transparent to the optical signal.

Table 1 reports the transmission characteristics of the pump combiner suitable for the Raman amplifier of FIG. 3 according to a preferred embodiment of the invention.

TABLE 1

| Port-to-port | Wavelength | Insertion loss (dB) |
|---|---|---|
| A -> B | $\lambda_S$ | 0.35 |
| A -> B | $\lambda_{P1} + \lambda_{P2}$ | >40 |
| A -> D | $\lambda_S$ | 40 |
| B -> A | $\lambda_{P3} + \lambda_{P4}$ | >40 |
| C -> A | $\lambda_{P1} + \lambda_{P2}$ | 0.45 |
| A -> C | $\lambda_S$ | >40 |
| C -> D | $\lambda_{P1} + \lambda_{P2}$ | >40 |
| C -> B | $\lambda_{P1} + \lambda_{P2}$ | >40 |
| B -> D | $\lambda_{P3} + \lambda_{P4}$ | 0.45 |
| B -> C | $\lambda_{P3} + \lambda_{P4}$ | >40 |

Figure 5:
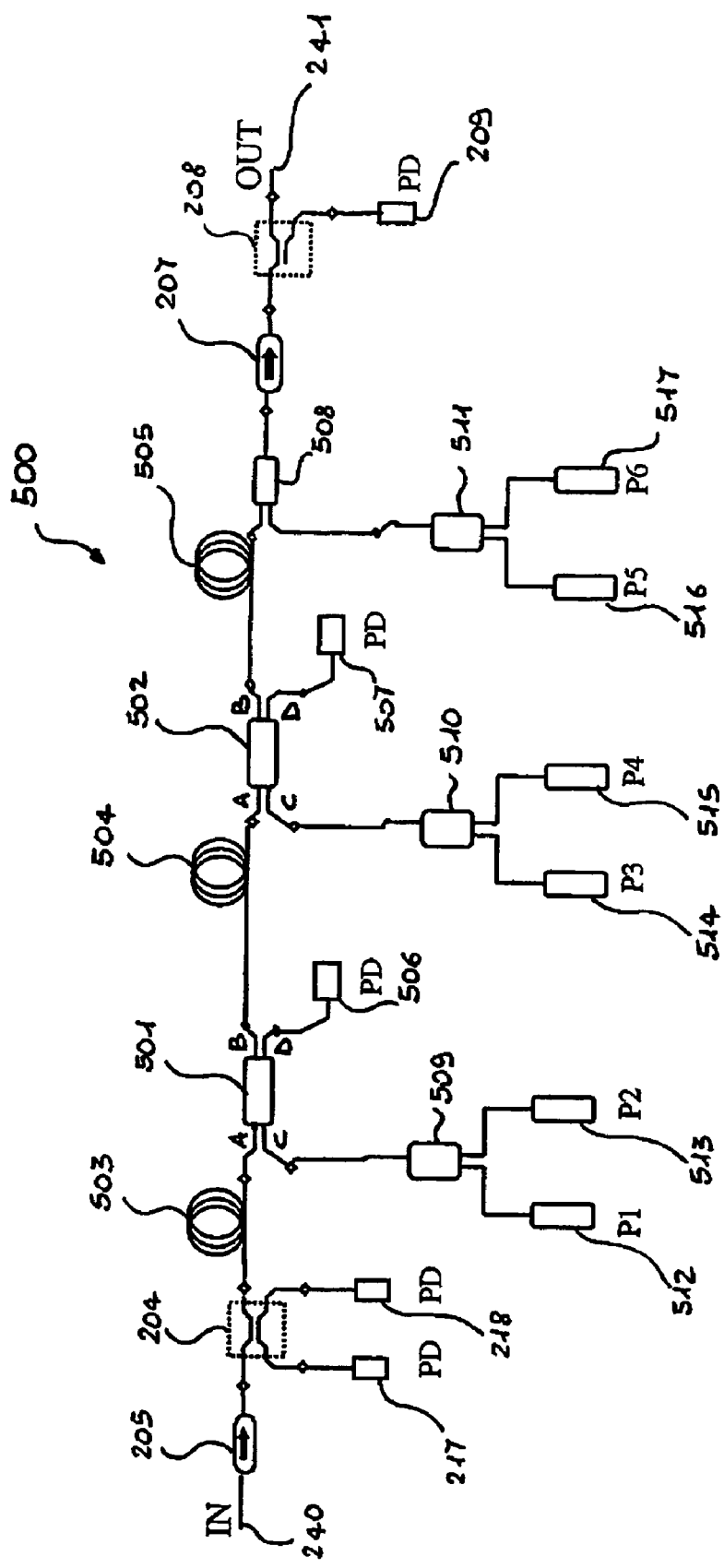
FIG. 5 is a block diagram illustrating a three-stage optical amplifier according to a further embodiment of the present invention.

FIG. 5 is a block diagram illustrating a three-stage optical amplifier according to a further embodiment of the present invention. Elements that correspond to the embodiment of FIG. 2 are given identical numbers. Mid-stage wavelength-selective pump combiners 501 and 502 are placed between first and second amplification stages and between second and third amplification stages, respectively. In the first amplification stage, pump radiation from pump sources 512 (P1) and 513 (P2) is combined by means of WDM 509, coupled to pump combiner 501 that redirects it to a first length of Raman-active optical fibre 503. In the second amplification stage, pump radiation from pump sources 514 (P3) and 515 (P4) is combined by means of WDM 510, coupled to pump combiner 502 that redirects it to a first length of Raman-active optical fibre 504. Third amplification stage comprises pump source 516 (P5) and pump source 517 (P6). Pump beams of P5 and P6 are combined together by WDM 511, and then coupled by means of a WDM coupler 508 to a third length of Raman-active optical fibre 505. Each of the six pump operates at a separate wavelength. Pump combiner 501 prevents the pump radiation from P3+P4 from reaching the first amplification stage. Analogously, the passage of the pump radiation from P5+P6 from the third stage into the second stage is substantially blocked by pump combiner 502. Photodiode 506 monitors the residual pump power of pumps P3+P4, whereas photodiode 507 monitors the residual pump power of P5+P6.

Preferably, pump wavelengths of P1–P6 are the following: $\lambda_{P1}$=1425 nm, $\lambda_{P12}$=1440 nm, $\lambda_{P3}$=1470 nm, $\lambda_{P4}$=1510 nm, $\lambda_{P5}$=1540 nm, and $\lambda_{P6}$=1555 nm. The average launch power of the six pumps is of about 400 mW and vary only between 350 and 500 mW. Amplifier has a flat gain response for a WDM signal band of about 2 dB, between about 1530 nm and 1670 nm.

It will be understood that obvious modifications of the illustrated embodiments will not depart from the scope of the invention. For example, a multiple wavelength pump source can be used at each amplification stage of the Raman amplifier in place of two pump sources operating at two distinct wavelengths.

Although a counter-propagating pumping scheme is preferred because of minimisation of the overall noise figure, the invention can be extended to a multiple stage Raman amplifier having a co-propagating pumping scheme for one or more stages. In case of an all co-propagating scheme, the first pump signal originating from the first pump source will be monitored and the second pump signal will be coupled to the pump combiner.

The multiple stage Raman amplifier according to the present invention may be advantageously used in metropolitan, long-haul or ultra long-haul optical systems for amplifying wavelength division multiplexing or DWDM optical signals. The amplifier of FIG. 2, FIG. 3 or FIG. 5 may advantageously amplify an optical signal in the C- plus L-band exploiting all the available wavelength band for the wavelength division multiplexing optical signal.

According to one aspect of the present invention, an optical system comprises an optical transmission line adapted to transmit optical signals between a transmitting station and the receiving station, wherein said transmission line includes one or more multiple stage Raman amplifiers of FIG. 2, FIG. 3 or FIG. 5 and at least an optical fibre. The transmitting station includes a plurality of transmitters and the receiving station includes a plurality of receivers. The transmitters included in the transmitting station provide an optical signal to be coupled into the optical transmission line. Typically, each transmitter may comprise a laser source, adapted to emit a continuous wave optical signal having a predetermined wavelength, and an external optical modulator, for example a lithium niobate modulator, adapted to superimpose on the continuous wave optical signal emitted by the laser source a traffic signal at a predetermined high frequency or bit rate, such as for example 10 Gbit/s or 40 Gbit/s. The different signal wavelengths emitted by the plurality of transmitters are multiplexed by multiplexing device. Such multiplexing device can be any kind of multiplexing device (or combination of multiplexing devices), such as a fused fibre or planar optics coupler, a Mach-Zehnder device, an AWG (Arrayed Waveguide Grating), an interferential filter, a micro-optics filter and the like.

Each receiver is adapted to convert an incoming optical signal in an electrical signal. A demultiplexing device allows to separate the different signal wavelengths from a single optical path to a plurality of optical paths, each terminating with a receiver. The demultiplexing device can be any kind of demultiplexing device (or combination of demultiplexing devices), such as a fused fibre or planar optics coupler, a Mach-Zehnder device, an AWG (Arrayed Waveguide Grating), an interferential filter, a micro-optics filter or the like.

The invention claimed is:

1. A multiple stage Raman optical amplifier for amplifying an optical transmission signal within a transmission wavelength band comprising:
   a first amplification stage comprising a first length of Raman-active optical fibre and a first pump source for generating a first pump signal within a first pump wavelength band, said first pump signal being coupled to one end of the first length of Raman-active optical fibre;
   a second amplification stage comprising a second length of a Raman-active optical fibre and a second pump source for generating a second pump signal within a second pump wavelength band different from the first wavelength band, said second pump signal being coupled to a first end of the second length of Raman-active optical fibre, whereby a residual pump signal appears at a second end, opposite to the first end, of said second length of fibre; and
   a wavelength-selective pump combiner interposed between the first and the second amplification stages adapted for substantially transmitting the optical transmission signal between the first amplification stage and the second amplification stage, the pump combiner including a first port coupled to said one end of the first Raman-active fibre, a second port coupled to the second end of the second Raman-active fibre, and a third port coupled to the first pump source, wherein the pump combiner is arranged for substantially passing the first pump signal coupled to the third port to the first port and for substantially blocking the passage of the residual pump signal coupled to the second port into the first amplification stage.

2. The multiple stage Raman optical amplifier of claim 1, wherein the wavelength-selective pump combiner further includes a fourth port and is arranged for substantially passing the residual pump signal of the second pump source to the fourth port.

3. The multiple stage Raman optical amplifier of claim 2, further comprising a photodetector optically coupled to the fourth port of the pump combiner for monitoring the residual pump signal of the second pump source.

4. The multiple stage Raman optical amplifier of claim 1, wherein the transmission wavelength band of the optical transmission signal is between 1520 nm and 1630 nm.

5. The multiple stage Raman optical amplifier of claim 4, wherein the first pump wavelength band of the first pump signal is between 1415 and 1465 nm and the second wavelength band of the second pump signal is between 1465 and 1520 nm.

6. The multiple stage Raman optical amplifier of claim 1, wherein the pump combiner includes at least a thin film filter adapted to reflect the first and the second wavelength bands of the pump sources.

7. An optical system comprising an optical transmission line including at least an optical fibre and a multiple stage Raman optical amplifier of any one of claims 1–6.

8. A method for pumping a multiple stage Raman optical amplifier comprising a first Raman amplification stage and a second Raman amplification stage, the first and second stage being coupled to each other by an interstage wavelength-selective pump combiner, the method comprising:
   feeding into the first Raman amplification stage a first pump signal with a wavelength within a first pump wavelength band;
   feeding into the second Raman amplification stage a second pump signal with a wavelength within a second wavelength pump band having no overlap with the first pump wavelength band; and
   reflecting the second pump signal in the pump combiner so as to prevent a residual pump signal from the second Raman amplification stage within the second pump wavelength band from reaching the first Raman amplification stage.

9. The method of claim 8, wherein feeding of the first pump signal into the first amplification stage is performed by reflecting said first pump signal in the pump combiner.

* * * * *